Figures 1, 2:
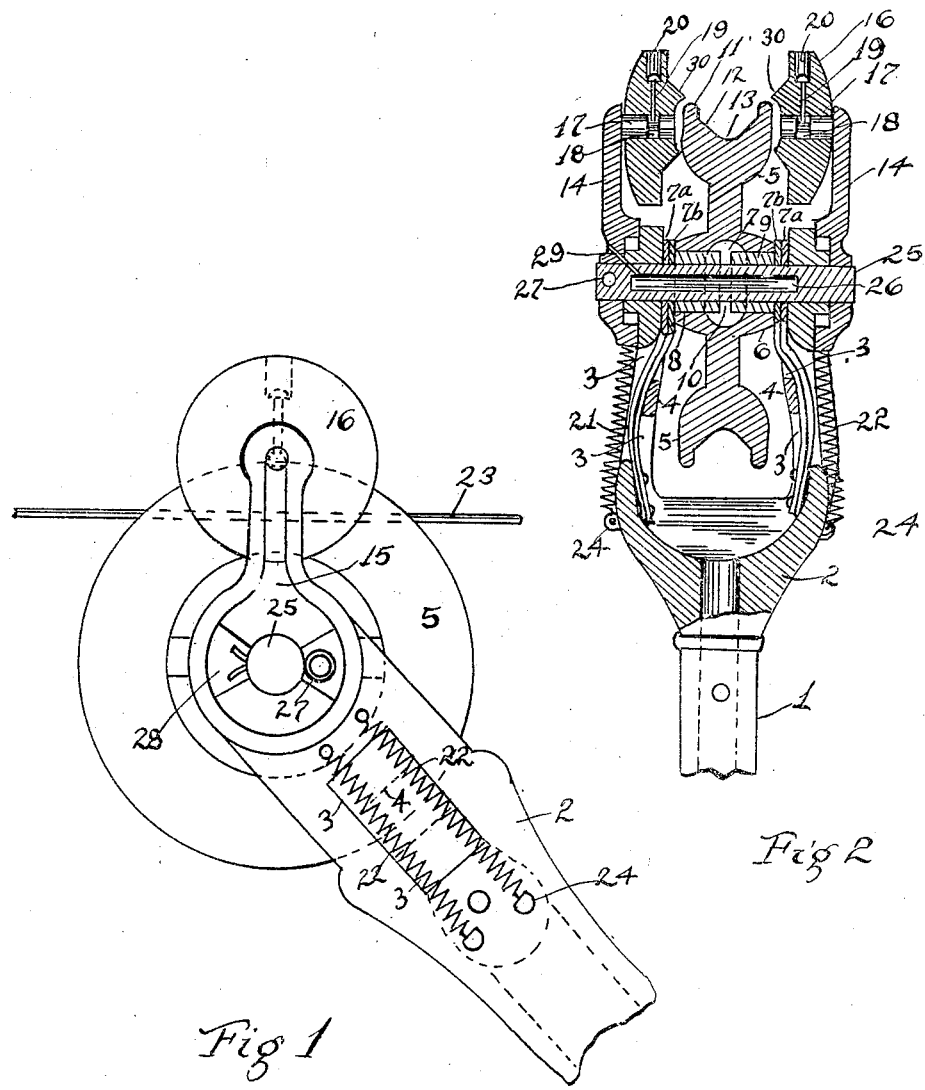

C. E. MARKS.
TROLLEY HEAD AND HARP.
APPLICATION FILED SEPT. 6, 1907.

904,491.

Patented Nov. 17, 1908.

Witnesses
M. A. Spencer
J. C. Dabney

Charles E. Marks, Inventor.
By Walter B. Burrows
Attorney

UNITED STATES PATENT OFFICE.

CHARLES E. MARKS, OF VIRGINIA BEACH, VIRGINIA, ASSIGNOR OF ONE-FOURTH TO ALGAR M. WHEELER, OF NORFOLK, VIRGINIA.

TROLLEY HEAD AND HARP.

No. 904,491.  Specification of Letters Patent.  Patented Nov. 17, 1908.

Application filed September 6, 1907. Serial No. 391,635.

*To all whom it may concern:*

Be it known that I, CHARLES E. MARKS, a citizen of the United States, residing at Virginia Beach, county of Princess Anne, and State of Virginia, have invented certain new and useful Improvements in Trolley Heads and Harps, of which the following is a specification.

My invention relates to trolley heads and harps.

The object of the invention is to prevent the trolley wheel from leaving the overhead wire until released therefrom.

A further object of my invention is to provide a trolley harp or wheel holder that will be durable and efficient.

Further objects and advantages will be more fully described herein and specifically pointed out in the claims recourse being had to the accompanying drawing forming a part of this specification in which—

Figure 1 is a side view and Fig. 2 is a sectional view.

In the drawings like reference numerals indicate similar parts in all the views:—

1 is the neck of the trolley harp and 2 is the harp the latter is bifurcated as shown.

3 are openings on each side of the bar or bridge 4 which will be explained hereafter.

5 is the trolley wheel provided with a hub portion 6 and an annular recess 7 in the center, as shown in Fig. 2.

7ª are springs made to pass over the bars 4 and locked within the harp 2 so as to hold them in place.

7ᵇ are similar pieces of metal but usually made of copper so that the wear of the trolley wheel hub 6 will be upon it, the spring holding the copper piece against the hub to get a perfect electrical contact.

8 and 9 are sleeves of anti-friction metal or material which do not come together at the center of the hub thus leaving an annular channel 10 for oil.

The trolley wheel is provided with a vertical rim portion 11, an angular periphery 12 and a concave bottom portion 13, as shown in Fig. 2.

14 are movable arms provided with a rim or bead and support the wheels or rollers 16 upon the pins 17.

18 is an annular channel in each pin as will be described hereafter.

19 are pins or screws placed in a recess 20 in the periphery of the wheels the lower ends of the pins in the channel keeps the wheels on the pins 17.

21 and 22 are springs secured to the parts 15 at two points so that the latter may move backward and forward upon a pin. The lower ends of the springs are fixed to the trolley harp at 24 as shown in Fig. 1.

25 is the pin or axle for the trolley wheel and is provided with an oil channel 26. The pin is held in place by the key or cotter 27 in a recess 28 (Fig. 1).

29 is an oil hole for placing oil in the hollow portion of the pin 25.

The wheels 16 have a tapered portion 30 on one side as shown in Fig. 2 so that they may come slightly over the rims of the trolley wheel thus guiding the trolley wire to the concave groove 13 of the trolley wheel. The wheels 16 adjust themselves when the trolley wheel passes over switches, turnouts, crosses and the like.

Having described my invention and what I claim and desire to secure by Letters Patent is:—

1. A device of the class described comprising a trolley harp having openings in the sides thereof, a trolley wheel carried by the harp, pivotally mounted arms carried by said harp, spring means carried by said harp and engaged with said arms, inwardly directed pins carried by said arms, and wheels removably engaged with said pins and disposed one at each side of the trolley wheel.

2. A device of the class described comprising a trolley harp, a hollow pin carried by said harp, a wheel revolubly mounted upon said pin, movable arms carried by said pin, wheels carried by said arms and having beveled sides adjacent to the sides of the first named wheel, and spring means for yieldingly supporting said arms, one of said arms having an oil inlet passage in communication with the hollow pin.

3. The combination with a trolley harp and wheels therefor, of yieldingly mounted arms carried by said harp, inwardly directed pins carried by said arms and having grooved portions between their ends, wheels carried by said arms, and pins carried by said wheels for engagement in the grooved portions of said first named pins.

4. A device of the class described comprising a harp, movable arms carried by said harp, spring means for yieldingly supporting said arms, pins carried by said arms and having annular channels, wheels carried by said pins, and removable pins carried by said wheels for engagement in said channels.

5. A device of the class described comprising a trolley harp having openings in the sides thereof, a hollow pin carried by said harp, a wheel mounted upon the pin, swivel plates carried by the harp, one of said plates having a passage in communication with the hollow pin, and spaced wheels removably engaged with said plates and arranged to lie with portions at each side of said wheel.

6. A device of the class described comprising a trolley harp provided with apertures, a bridge or bar dividing the apertures into two parts, plate spring means through said openings, and a bearing plate adapted to come in contact with the trolley wheel.

7. A device of the class described comprising a trolley harp, an opening therein, a bridge or bar dividing the opening, a spring plate passing through the openings and over the bar or bridge, a spring pressed bearing plate adapted to make contact with the trolley wheel, and a hollow pin for supporting said trolley wheel.

In testimony whereof I have hereunto affixed my signature in the presence of two witnesses.

CHARLES E. MARKS.

Witnesses:
 WALTER B. BURROW,
 M. P. HENRIS.